US008622436B2

(12) United States Patent
Mehta et al.

(10) Patent No.: US 8,622,436 B2
(45) Date of Patent: Jan. 7, 2014

(54) CHEMICALLY REACTIVE SECURITY INK, A METHOD OF USE OF SUCH INK, AND SECURITY DOCUMENTS INCORPORATING SUCH INK

(75) Inventors: Rajendra Mehta, Dayton, OH (US); Steven L. Yeager, Dayton, OH (US); Stephen D. Webendorfer, Miamisburg, OH (US)

(73) Assignee: The Standard Register Company, Dayton, OH (US)

(*) Notice: Subject to any disclaimer, the term of this patent is extended or adjusted under 35 U.S.C. 154(b) by 1682 days.

(21) Appl. No.: 11/754,630

(22) Filed: May 29, 2007

(65) Prior Publication Data
US 2007/0281139 A1  Dec. 6, 2007

Related U.S. Application Data

(60) Provisional application No. 60/810,086, filed on Jun. 1, 2006.

(51) Int. Cl.
B42D 15/10 (2006.01)
B41M 5/04 (2006.01)
B41M 3/14 (2006.01)
B44F 1/12 (2006.01)
G09C 3/10 (2006.01)
C09D 11/00 (2006.01)

(52) U.S. Cl.
USPC ............... 283/96; 283/72; 428/195.1; 427/7; 106/31.27; 106/31.28; 106/31.44

(58) Field of Classification Search
USPC ............ 106/31.27, 31.28, 31.44; 283/93, 72, 283/95, 96; 523/160; 524/594; 427/7
See application file for complete search history.

(56) References Cited

U.S. PATENT DOCUMENTS

| | | | | |
|---|---|---|---|---|
| 3,510,385 A | * | 5/1970 | Lythgoe et al. | 428/29 |
| 5,197,765 A | * | 3/1993 | Mowry et al. | 283/93 |
| 5,209,515 A | | 5/1993 | Dotson et al. | |
| 5,340,159 A | * | 8/1994 | Mowry, Jr. | 283/93 |
| 5,601,683 A | | 2/1997 | Martin | |
| 5,636,874 A | | 6/1997 | Singer | |
| 6,306,929 B1 | | 10/2001 | Amon et al. | |
| 2005/0064151 A1 | * | 3/2005 | Mehta et al. | 428/195.1 |

FOREIGN PATENT DOCUMENTS

| | | | |
|---|---|---|---|
| EP | 1514695 A1 | * 3/2005 | |
| GB | 2326866 A | * 1/1999 | |
| WO | WO 2005/044924 A1 | * 5/2005 | C09B 67/08 |

* cited by examiner

*Primary Examiner* — Mark Ruthkosky
*Assistant Examiner* — Laura C Powers
(74) *Attorney, Agent, or Firm* — Dinsmore & Shohl LLP

(57) ABSTRACT

A document uses a chemically reactive security ink to facilitate security, making it more difficult to alter a genuine security document. The chemically reactive security ink masks a warning word or message on a security document. The hidden warning word or message is revealed when the document is subjected to chemical washing.

23 Claims, 4 Drawing Sheets

CHEMICALLY REACTIVE SECURITY INK, A METHOD OF USE OF SUCH INK, AND SECURITY DOCUMENTS INCORPORATING SUCH INK

CROSS-REFERENCE TO RELATED APPLICATIONS

This application claims the benefit of provisional patent application Ser. No. 60/810,086, filed Jun. 1, 2006, under 35 U.S.C. 119.

STATEMENT REGARDING FEDERALLY SPONSORED RESEARCH OR DEVELOPMENT

Not applicable.

BACKGROUND OF THE INVENTION

The present invention relates to chemically reactive security ink, a method of using such ink, and documents incorporating such ink, and more particularly to such ink, method, and documents in which fraudulent changes to security documents may be made obvious.

A number of approaches have been taken in the past to thwart or reduce the fraudulent modification of security documents. It has been common for criminals to modify a security document, for example increasing the value of a bank check, by applying a solvent to the security document to remove a portion of the valid written information from an area of the document and then typing, printing or writing altered information into the same area on the document. Various approaches have been taken in an attempt to make such document alterations noticeable and, therefore, ineffective. U.S. Pat. No. 6,306,929 teaches a bleeding ink that is used for printing security documents. The '929 patent discloses bleeding inks having non-drying vehicles, as well as using dyestuffs sensitive to organic solvents and other chemical agents. The '929 patent suggests the same dyes used in known bleeding inks, such as Solvent Blue 67.

U.S. Pat. No. 5,601,683 to Martin teaches printing a void pantograph in dye-based, solvent-sensitive inks that wash away with acetone or bleach. U.S. Pat. No. 5,209,515 to Dotson et al teaches a solvent sensitive ink which reacts to the application of a solvent or pressure to form a visible stain, image, or warning indicia, such as for example the word "VOID". It may be printed as repeating text, a spot, or as a full coating. The '515 patent discloses an ink that changes from colorless to a color, providing a covert security feature. The ink remains invisible until it is attacked by solvent. It is known that some solvent-sensitive void coatings of this sort will wash away completely if soaked long enough.

U.S. Pat. No. 5,636,874 to Singer teaches a feature that can be used for authentication and validation. Temperature-sensitive ink is printed over a temperature-insensitive message, both inks being of the same color. When the document is rubbed or heated, the temperature sensitive ink turns colorless and this reveals a message such as "VALID" underneath. Upon cooling, the color returns once again, masking the message.

Various chemically reactive inks have been used for security purposes. Bleeding inks, erasable inks, coin-reactive inks, transparent inks, pen-reactive inks, transparent inks, heat reactive reversible and irreversible inks, infrared inks, optically variable inks, photochromic inks, and ultraviolet invisible fluorescent inks all offer ways of either authenticating by effecting a change in appearance under controlled circumstances, or provide protection against fraud by making undetected alteration more difficult.

In another alteration technique, called check washing, a check is fraudulently altered after washing it with any of a number of chemical cleaners to remove the valid data. This most commonly occurs with handwritten checks. Check washing is less commonly used with commercial checks that are printed with a toner ink, since a solvent may not be as effective as scraping and picking the toner from the check surface mechanically.

It is seen, therefore, that a need exists for an improved ink and method of use of such ink, as well as an improved security document, in which alterations to the security document are made more obvious such that the fraudulent use of the document is prevented or made more difficult.

SUMMARY OF THE INVENTION

This need is met by a chemically reactive security ink, substantially as disclosed and described herein. The chemically reactive security ink comprises a solvent soluble dye, and a non-drying vehicle or ink base. The solvent soluble dye may be selected from the group of azo, xanthene, anthraquinone, triarylmethane, azine, thiazine, phathalocynine, and metal complexes of the same. The solvent soluble dye may comprise a solvent soluble dye selected from the group of solvent black 3, solvent black 5, solvent red 23, solvent red 132, solvent red 8, solvent red 49, solvent red 89, solvent red 122, solvent blue 4, solvent blue 5, solvent blue 35, solvent blue 44, solvent blue 45, solvent blue 59, solvent blue 97, solvent violet 9, and solvent violet 8. The solvent soluble dye in the ink may be between 0.1% and 20% by weight, and more preferably between 1% and 8% by weight. The non-drying vehicle or ink base may comprises a blend of two or more of tall oil butyl ester, modified phenolic resin, silica, and calcium stearate. The resin may comprise from 10% to 60% of the non-drying vehicle or ink base by weight, and more preferably from 32% to 45% of the non-drying vehicle or ink base by weight. The oil may comprise from 30% to 90% of the non-drying vehicle or ink base by weight, and more preferably from 40% to 65% of the non-drying vehicle or ink base by weight. The silica may comprise from 0% to 15% of the non-drying vehicle or ink base by weight, and more preferably from 6% to 9% of the non-drying vehicle or ink base by weight. The calcium stearate may comprise from 0% to 6% of the non-drying vehicle or ink base by weight, and more preferably from 1% to 3% of the non-drying vehicle or ink base by weight.

The ink may include one or more additional solvent dyes. Further, it may include a bleach reactive chemical.

A security document incorporates the chemically reactive security ink, and comprises a document substrate, a message on the substrate, and a solvent soluble masking ink printed over the message. By this arrangement, when the masking ink is removed as a result of the application of solvent, the message becomes visible. The message may be a warning message that only becomes visible after solvent is applied to the masking ink. The message may be printed on the substrate adjacent an area that carries handwritten information. The message may be printed in a pantograph pattern, and with the masking ink also printed in a pantograph pattern. The message may be printed adjacent one or more information areas on the security document, around the periphery of one or more information areas on the security document, or in one or more information areas on the security document.

The security document may be a bank check having a front face and a rear face, with the message being printed on the front face of the bank check adjacent to or in at least one of a written amount area, a numerical amount area, a payee area, and a MICR account and routing number area. The security document may be a bank check having a front face and a rear face, with the message being printed on the rear face of the bank check adjacent to or in an endorsement area.

It will be appreciated that it is an object of the present invention to provide a security ink and a security document carrying such ink in which the document is protected against nefarious alteration or change.

DETAILED DESCRIPTION OF THE PREFERRED EMBODIMENTS

Figure 1:
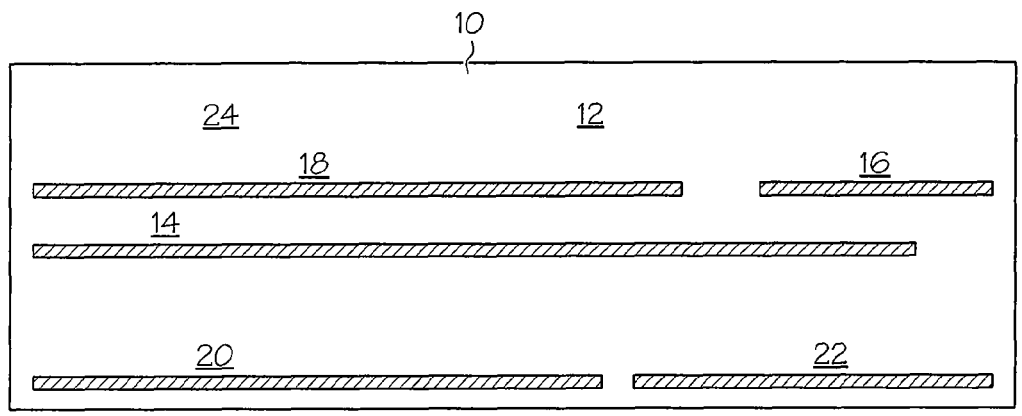
FIGS. 1 and 2 illustrate the possible placement patterns of the ink of the present invention on a security document, such as a check.

The present invention relates to a chemically sensitive security ink, and the use of such ink on secure documents. The security ink, when exposed to a solvent, changes color, or changes between a colored and colorless state. This change in color or opaqueness can provide an indication of tampering with a document, or can be used to authenticate a document. The ink has the advantage of being reactive with a wide variety of solvents—polar, nonpolar, aliphatic, aromatic, oxygenated, and halogenated. Further, the ink can be used on documents that will subsequently be processed through laser printers.

The invention also contemplates printing a solvent sensitive ink over a message on a security document in order to mask or to obscure the message. The message is preferably printed in a solvent resistant ink. The message remains hidden until the masking ink is exposed to solvent and its color removed. The solvent sensitive ink of the present invention is preferred as the masking ink, but other solvent sensitive inks are also contemplated. An exemplary use in this fashion is on security documents, such as certificates of title, bank checks, currency, birth certificates, negotiable documents, gift certificates, college transcripts, and the like. The message could be used to indicate an attempt to alter the security document through the use of the solvent. Other uses for the hidden message arrangement, including authentication, will also be apparent.

In one version of the security document, having a hidden message, if the security document has a background printed as pantograph, the message is preferably printed in the same ink as the pantograph. Pantographs are typically printed by wet offset, lithography, or rotogravure printing processes, and are typically printed with inks that are relatively impervious to solvents once completely cured or dried. The message portion of the document may be in narrative form, such as for example, "If you can read this message, this document has been compromised." Alternately the message may simply be "Tamper-Alert!," "VOID," or a graphic of some sort. The message may be printed anywhere on the security document, including its front and rear surfaces. Preferably, the masking ink and message ink are the same color.

The preferred masking ink utilizes a non-drying vehicle such that it remains open to being sensitive to solvents. The ink may also bleed through to the opposite side of the paper, creating feature that is difficult to duplicate if an attempt is made to replicate the form with a copier or scanner. While non-drying, the ink is compatible for use on documents being processed through laser printers.

The security documents preferably contain multiple security features to thwart criminal attempts at altering or duplicating the form. Using more features results in more robust fraud protection. Such features may include any combination feature, such as a void pantograph for anti-copy protection, thermochromic ink for validation or authentication purposes, laid lines to prevent cut and paste fraud, solvent sensitive coatings, printings, or speckles that go from colorless to color upon attacks from solvents, water marks, security threads, colored paper fibers, high resolution borders, microprinting, and any other of a large number of security features that are known in the art.

The chemically reactive security ink of the present invention may also be used apart from obscuring a hidden message. For example, it may be used as a bleeding numbering ink. It may be used for printing lines or borders around certain fields of a security document such as the payee field, convenience amount field, written amount field, MICR account field, or other fields of a bank check.

This novel chemically reactive security ink can be applied by wet offset lithography and letterpress to any document needing a security feature that makes it evident to even a casual observer that tampering using solvents to remove inks and toners has occurred. The most preferred method of printing this ink is dry offset printing or letterpress printing.

The chemical reactive ink of this invention reacts with a variety of solvents—polar, nonpolar, aromatic, aliphatic, halogenated, and oxygenated. A hidden message can be printed under the ink so that it is revealed if there is any tampering with the document using a solvent. The hidden message can be printed by any typical method, such as flexography, wet or dry lithography, or screen-printing. The message will be hidden best if the message is printed with an ink that has a color which matches that of the chemical reactive ink. The message can be printed as either a solid or a screen, varying from a 100% solid to a 1% screen. The chemical reactive ink can be printed in a pattern, such as Chinese characters or pseudorandom marble patterns, to hide the message effectively.

Other security techniques can be used with security document according to the present invention, providing cumulative security provisions. For example, other arrangements can be added for detecting the use of solvents. These arrangements include using paper that has one or several dyes as dry particles that will spread and create small stained dots when exposed to solvent. More than one dye is typically used to react with all types of solvents. Certain prior art inks may also be used, although they may not be as effective as desired, since if the forger is patient and washes the document with one or more solvents over an extended period of time, the stains from such inks can be completely removed.

Another type of solvent reactive ink is the chemical void ink. Chemical void inks react with solvent to go from colorless to colored, and are usually printed as a message such as "VOID." Some void inks are reactive with bleach, producing a color image when exposed to bleach. Chemical void inks typically contain solid leuco dyes and solid activators. The active components are only soluble in polar and oxygenated solvents (e.g. alcohols, ketones, esters) and thus tampering with non-oxygenated solvents is not revealed.

The chemical reactive ink of the present invention has the advantage over security paper and void inks of the prior art that it reacts with a wide variety of solvents—polar, nonpolar, aliphatic, aromatic, oxygenated, and halogenated. When exposed to solvent, the ink color will disappear and a hidden message can be revealed that confirms tampering. As stated above, prior art chemical void inks may not reveal tampering with a non-oxygenated solvent, and some dyes within a security paper can be completely dissolved and washed away leaving no evidence of tampering. Some examples of solvents that effectively remove the color from the invention are: methanol, ethanol, isopropanol, hexyl carbitol, 1-pentanol, acetone, toluene, gasoline, isopropyl amine, 1-methyl-2-pyrrolidone, mineral spirits, S-limonene, orange oil, m-xylene, propylene glycol propyl ether, heptanes, caprolactone, chloroform, diethylene glycol monobutyl ether, phenyl ether, 3-methyl-2-butanone, 2-butanone, carbon tetrachloride, propylene glycol monomethyl ether acetate, oleic acid, dioctyl phthalate, 2-ethyl hexanoic acid, rubbing alcohol, and nail polish remover.

The chemical reactive ink of the present invention is comprised of two parts. The first part is a solvent soluble dye. Any solvent dye can be incorporated into the invention. Such dyes can be from any of the chemical families of solvent dyes, such as azo, xanthene, anthraquinone, triarylmethane, azine, thiazine, phathalocynine, and metal complexes of the same. The most effective solvent dye is soluble in a wide variety of solvents. The preferred dye for this invention is from the anthraquinone family, specifically solvent blue 35 [1,4-bis(butylamine)anthraquinone]. Examples of other dyes that can be used, however, are: solvent black 3, solvent black 5, solvent red 23, solvent red 132, solvent red 8, solvent red 49, solvent red 89, solvent red 122, solvent blue 4, solvent blue 5, solvent blue 35, solvent blue 44, solvent blue 45, solvent blue 59, solvent blue 97, solvent violet 9, and solvent violet 8. The present invention is not to be considered to be limited to any specific dye, however. The concentration of dye in the ink can be from 0.1% to 20%, with the preferred range being 1% to 8%.

The second part is a non-drying vehicle or ink base. Although a drying vehicle (e.g., based on either an alkyd or linseed oil) or UV curable vehicle can be used, such vehicles tend to trap the dye in a crosslinked matrix which reduces the amount of dye that can be dissolved and leached out by the solvent. The preferred base consists of a blend of two or more of tall oil butyl ester, modified phenolic resin, silica, and calcium stearate. This base provides good printing qualities, solvency of the dye, and is non-drying. Other types and combinations of resins, oils, and modifiers may be equally effective. The level of resin can be from 10% to 60% of the non-drying vehicle or ink base by weight, with the preferred range being 32% to 45%. The oil level can be from 30% to 90% of the non-drying vehicle or ink base by weight, with the preferred range being 40% to 65%. Silica can be incorporated at 0% to 15% of the non-drying vehicle or ink base by weight, with the preferred level being 6% to 9%. The calcium stearate can be added at 0% to 6% of the non-drying vehicle or ink base by weight, with the preferred level being 1% to 3%.

When the ink has only the solvent dye as the colorant, the ink will go from colored to colorless when exposed to solvent. A third component can be added to give a color change. The component can be another solvent dye that is soluble in a limited group of solvents, and thus it could be dissolved out of the ink with the blue or remain on the paper depending on the solvent. The component can also be a pigment that cannot be dissolved by solvents. A portion of the pigment can be washed away by a solvent that solubilizes the ink base while a portion of the pigment remains in the paper fibers, giving a visible tint to the printed area. If a hidden message is printed under this ink, the ink is selected such that the message is visible through the pigment color.

An optional addition to the ink of the present invention is a bleach reactive chemical to reveal evidence of exposure to bleach. One such chemical is Chlorostain OR (a guanidine derivative) from Bayer Corp.

Another variation of the invention is using a dye dispersion mixed into a flexographic ink base. The solvent dye is ground to a small particle size to act as a pigment in the water-based ink. However, the dye can still be dissolved and removed by a solvent. This allows printing by flexographic methods.

Examples of formulations include the following, where Formula 1 is the preferred formulation.

| Formula 1 | |
|---|---|
| SPR 10 Resin | 41.70% |
| Sylfat 9012 | 43.72% |
| Aerosil R972 | 8.23% |
| Calcium Stearate | 1.35% |
| Solvent Blue 35 Dye | 5.00% |

SPR 10 Resin is available from Akzo Nobel Resins, Woodstock, Conn. This is a maleated phenolic modified resin.
Sylfat 9012 is available from Arizona Chemical, Panama City, Fla. This is a tall oil fatty acid butyl ester.
Aerosil R972 is available from Degussa Corp., Ridgefield Park, N.J. This is a hydrophobic fumed silica.
Calcium stearate is available from Witco Corp.
Solvent Blue G (Solvent Blue 35) is available from Aakash Chemical, Glendale Heights, Ill.

| Formula 2 | |
|---|---|
| SPR 10 Resin | 41.70% |
| Sylfat 9012 | 43.72% |
| Aerosil R972 | 8.23% |
| Calcium Stearate | 1.35% |
| Chlorostain RR | 5.00% |

Chlorostain RR is available from Bayer Corp., Pittsburg, Pa. This is Solvent Blue 97.
Chlorostain RR had lower solubility over the range of solvents as compared to Solvent Blue G.

| Formula 3 | | |
|---|---|---|
| Kohl and Madden Soy Laser PMS 293 Blue Ink | 90% | available from Kohl & Madden, Northlake, IL |
| Aakash Black BN Dye (Solvent Black 3) | 10% | |

Here, a solvent dye was incorporated into a conventional drying ink. The dye could be dissolved out of the ink immediately after printing but the amount of ink that could be removed after 24 hours was reduced due to oxidation of the ink vehicle.

| Formula 4 | |
| --- | --- |
| Kohl and Madden UV Warm Red FLMDV4481865 | 90% |
| Chlorostain Blue RR | 10% |

After curing, the amount of dye that could be removed was greatly reduced.

Figure 2:
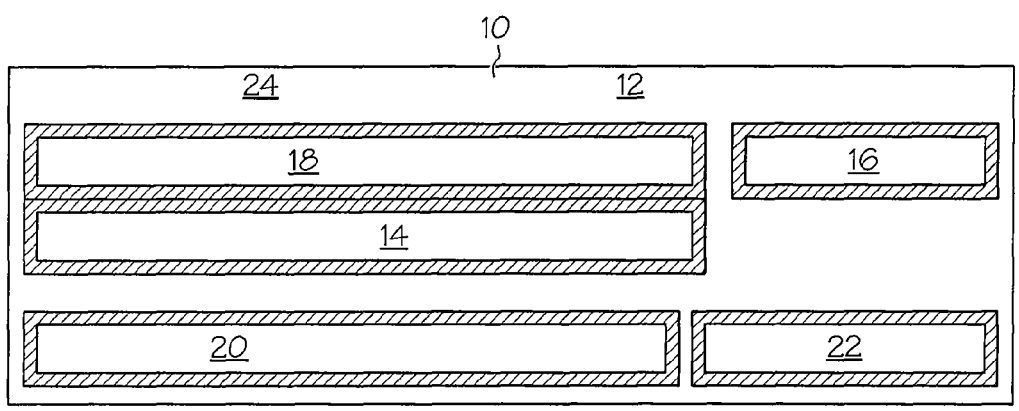

Turning to the drawings, it will be seen that the chemically reactive ink can be printed over a hidden warning message virtually anywhere on the security document. It is particularly advantageous to use such ink and hidden warning messages in those areas of the document that are most likely to be the subject of attempted alteration. FIGS. 1 and 2 illustrate a number of areas in which the masking ink may be applied to a security document, and common reference numerals are used in these two drawings to refer to corresponding elements. The security document 10 of FIG. 1 has a document substrate 12 which typically will be a paper or similar material. Typically, a message is printed on the substrate, and then a solvent soluble masking ink according to the present invention is printed over the message. When the masking ink is removed as a result of the application of solvent, the message becomes visible. The message may be a warning message that only becomes visible after a solvent is applied to said masking ink. The message is printed on the substrate 10 adjacent one or more information areas on the security document, as shown in FIG. 1. The solvent soluble masking ink may be applied over the message on the check. These areas include at least one of a written amount area 14, a numerical amount area 16, a payee area 18, a MICR account and routing number area 20 and the signature area 22. The chemical sensitive ink may be printed near one or more of these areas in a variety of patterns to reveal tampering with solvent.

Figure 3:
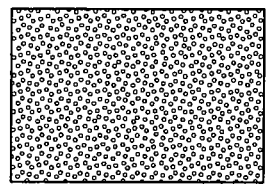
FIGS. 3 and 4 illustrate the appearance of the patterned solvent sensitive ink masking a VOID message, and with the masking ink removed, respectively.
Figure 4:
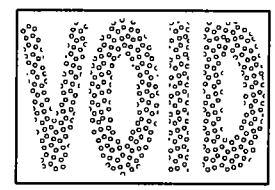

FIG. 3 shows an example of the masking ink being applied over a hidden message. The masking ink essentially obscures the VOID word from view. As shown in FIG. 4, however, when the masking ink is removed as a result of the application of solvent, a warning message is revealed which will give notice to even a casual observer that the document has been voided by alteration. The message may be printed in a pantograph pattern, as shown in FIG. 4, and then overprinted with the masking ink, also in a pantograph pattern, as shown in FIG. 3.

Figure 5:
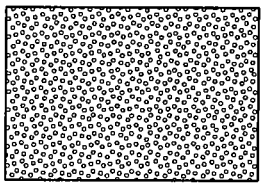
FIGS. 5 and 6 illustrate the appearance of the patterned solvent sensitive ink masking a warning message, and with the masking ink removed, respectively.
Figure 6:
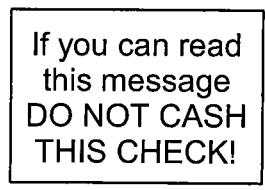

Alternatively, the message may be printed in a pale ink as shown in FIG. 6, and then overprinted with the masking ink in a pantograph pattern, as shown in FIG. 5. The warning message in this case is somewhat more lengthy. The masking ink essentially obscures the warning from view, as shown in FIG. 5. As illustrated in FIG. 6, however, when the masking ink is removed as a result of the application of solvent, a warning message is revealed which will give notice to even a casual observer that the document has been voided by alteration.

It will be appreciated that the hidden message may be printed on the substrate 10 in any of the areas 14, 16, 18, 20, and 22 that carry handwritten information, rather than adjacent these areas. This has the advantage of making it difficult to apply a solvent to the handwritten information without activating the masking ink. However, it has the disadvantage that the message could be partially obscured by the handwritten information. As a further alternative, the message may be printed around the periphery of one or more information areas 14, 16, 18, 20, and 22 on the security document, as shown in FIG. 2.

Figure 8:
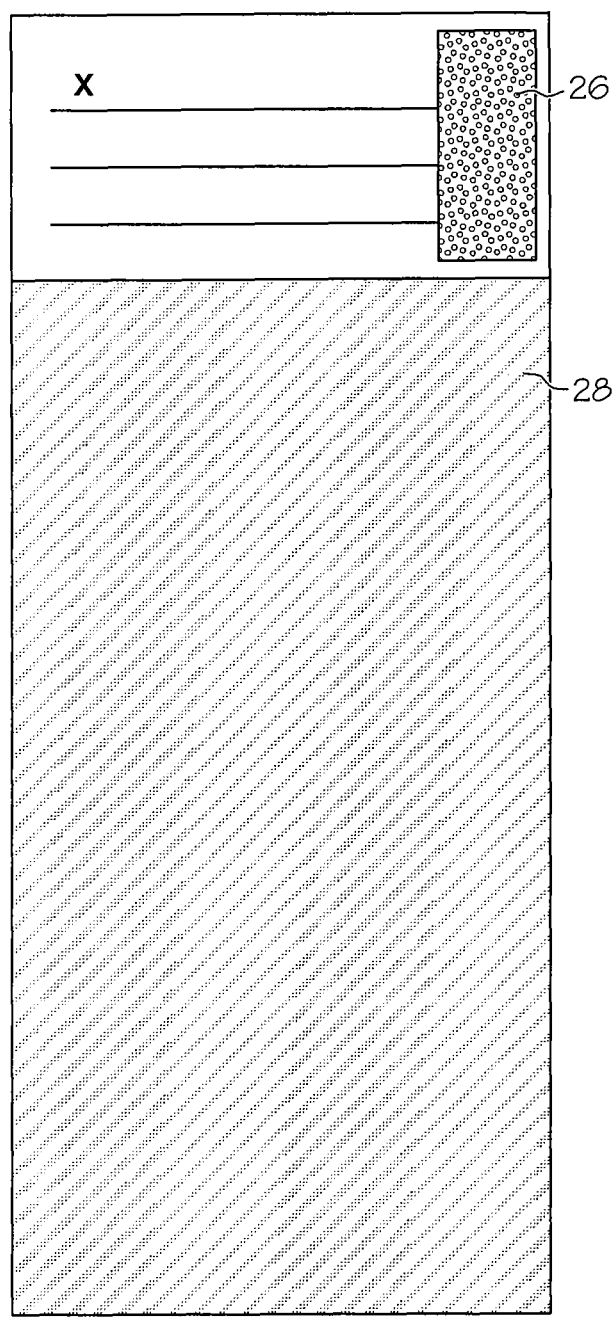
FIG. 8 shows another position of solvent sensitive ink over a hidden message in a bank check with the addition of other security features, such as laid lines printed on the back of the check.

FIGS. 1 and 2 show the application of the warning message to the front face 24 of the security document, such as a bank check. FIG. 8 shows the application of the warning message to the rear face of the bank check 10 in an endorsement area 26. FIG. 8 further illustrates the use of laid lines 28 which will make alteration of the bank check more difficult, especially if alteration by cutting and pasting the check is attempted.

Figure 7:
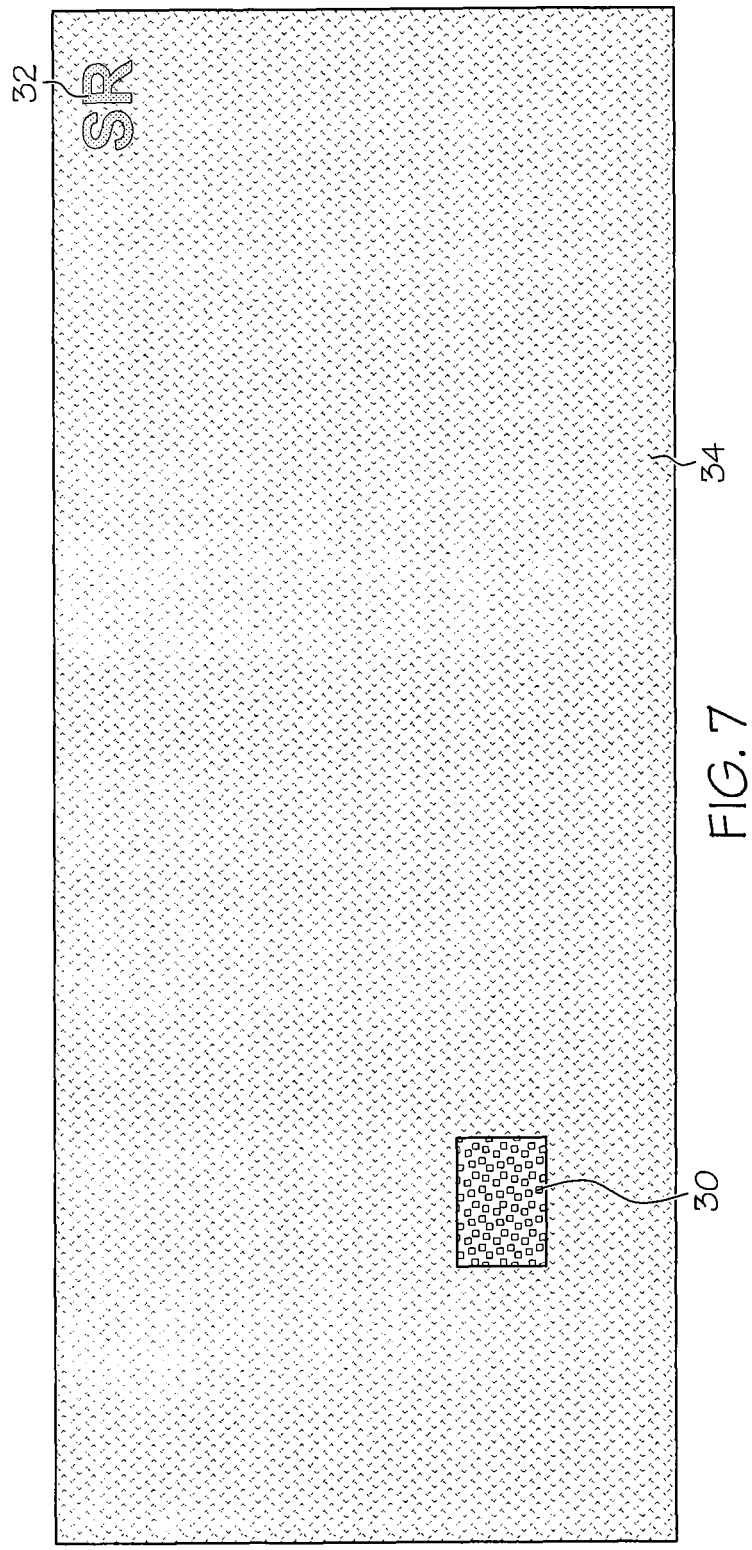
FIG. 7 shows one position of a solvent sensitive ink over a hidden message in a bank check with the addition of other security features, including an anti-copy pantograph and a thermochromic authentication insignia.

FIG. 7 illustrates the use of the masked warning message in conjunction with other security measures. For example, the masked warning message in area 30 may be combined with a thermochromic ink authentication insignia 32 and a void pantograph background pattern 34. The masked warning message provides an indication if the security document is photocopies, while the thermochromic ink authentication insignia will change color when subjected to heat to facilitate testing to be sure that the document is genuine.

Other aspects, objects, and advantages of the present invention can be obtained from a study of the drawings, the disclosure, and the appended claims.

What is claimed is:

1. A security document incorporating a chemically reactive security ink, comprising:
a document substrate,
a message printed on said document substrate in a solvent-resistant message ink, and
a solvent-soluble masking ink printed in a pattern over said message so that said pattern obscures or hides said message until said solvent-soluble masking ink is removed by exposure of said solvent-soluble masking ink to solvent,
wherein:
the solvent-soluble masking ink comprises a solvent-soluble dye and a non-drying vehicle or ink base;
the solvent-soluble dye is selected from the group consisting of azo dyes, xanthene dyes, anthraquinone dyes, triarylmethane dyes, azine dyes, thiazine dyes, phthalocyanine dyes, and metal complexes of the same;
the non-drying vehicle or ink base comprises from 10% to 60% by weight resin and from 30% to 90% by weight oil, based on the total weight of the non-drying vehicle or ink base;
the solvent-soluble masking ink comprises from 0.1% to 20% by weight said solvent-soluble dye, based on the total weight of the solvent-soluble masking ink.

2. The security document of claim 1, in which the message is a warning message.

3. The security document of claim 1, in which the message is printed on said document substrate adjacent an area that carries handwritten information.

4. The security document of claim 1, in which the message is printed in a pantograph pattern, and in which said solvent-soluble masking ink is printed in a pantograph pattern.

5. The security document of claim 1 in which said message is printed adjacent one or more information areas on the security document.

6. The security document of claim 5 in which said message is printed around the periphery of one or more information areas on the security document.

7. The security document of claim 1 in which said security document is a bank check having a front face and a rear face, and in which said message is printed on the front face of the bank check adjacent to at least one of a written amount area, a numerical amount area, a payee area, a MICR account and routing number area, and a signature area.

8. The security document of claim 7 in which said security document is a bank check having a front face and a rear face, and in which said message is printed on the front face of the bank check around the periphery of at least one of a written amount area, a numerical amount area, a payee area, a MICR account and routing number area, and a signature area.

9. The security document of claim 1 in which said security document is a bank check having a front face and a rear face, and in which said message is printed on the front face of the bank check in at least one of a written amount area, a numerical amount area, a payee area, a MICR account and routing number area, and a signature area.

10. The security document of claim 1 in which said security document is a bank check having a front face and a rear face, and in which said message is printed on the rear face of the bank check adjacent to an endorsement area.

11. The security document of claim 1 in which said security document is a bank check having a front face and a rear face, and in which said message is printed on the rear face of the bank check in an endorsement area.

12. The security document of claim 1 in which said solvent-soluble masking ink further comprises a second solvent-soluble dye that is soluble in a limited group of solvents with respect to said first solvent-soluble dye.

13. The security document of claim 1 in which said solvent-soluble masking ink further comprises a solvent-insoluble pigment.

14. The security document of claim 13 in which said solvent-insoluble pigment has a pigment color selected such that said message is visible through said pigment color when said solvent-soluble masking ink is exposed to solvent and said first solvent-soluble dye is removed.

15. The security document of claim 1 in which said solvent-resistant message ink and said solvent-soluble masking ink are the same color.

16. The security document of claim 1 in which said oil is a tall oil butyl ester.

17. The security document of claim 1 in which said resin is a phenolic resin.

18. The security document of claim 1 in which said oil is a tall oil butyl ester and said resin is a maleated phenolic resin.

19. The security document of claim 1, in which said solvent-soluble masking ink further comprises a modifier selected from the group consisting of silica, calcium stearate, and combinations thereof.

20. The security document of claim 1 in which:
said solvent-soluble masking ink comprises from 1% to 8% by weight said solvent-soluble dye, based on the total weight of the solvent-soluble masking ink; and
said non-drying vehicle or ink base comprises from 32% to 45% by weight said resin and from 40% to 65% by weight said oil, based on the total weight of the non-drying vehicle or ink base.

21. The security document of claim 20, in which said solvent-soluble masking ink further comprises a modifier selected from the group consisting of silica, calcium stearate, and combinations thereof.

22. The security document of claim 1 in which:
said solvent-soluble masking ink comprises from 1% to 8% by weight of said solvent-soluble dye, based on the total weight of the solvent-soluble masking ink;
said resin is a maleated phenolic resin;
said oil is a tall oil butyl ester; and
said non-drying vehicle or ink base comprises:
from 10% to 45% by weight said maleated phenolic resin, based on the total weight of the non-drying vehicle or ink base;
from 40% to 65% by weight said tall oil butyl ester, based on the total weight of the non-drying vehicle or ink base;
from 6% to 9% by weight silica, based on the total weight of the non-drying vehicle or ink base; and
from 1% to 3% calcium stearate, based on the total weight of the non-drying vehicle or ink base.

23. The security document of claim 22, in which said solvent-soluble dye is an anthraquinone dye.

* * * * *